US012607508B2

(12) United States Patent
     Kaajakari

(10) Patent No.: US 12,607,508 B2
(45) Date of Patent: Apr. 21, 2026

(54) PIEZOELECTRIC INTERFEROMETER

(71) Applicant: Murata Manufacturing Co., Ltd.,
     Nagaokakyo (JP)

(72) Inventor: Ville Kaajakari, Helsinki (FI)

(73) Assignee: MURATA MANUFACTURING CO.,
     LTD., Nagaokakyo (JP)

( * ) Notice: Subject to any disclaimer, the term of this
     patent is extended or adjusted under 35
     U.S.C. 154(b) by 216 days.

(21) Appl. No.: 18/517,362

(22) Filed: Nov. 22, 2023

(65) Prior Publication Data

US 2024/0175673 A1      May 30, 2024

(30) Foreign Application Priority Data

Nov. 25, 2022   (EP) ..................................... 22209598

(51) Int. Cl.
     G01J 3/26        (2006.01)
     G01J 3/02        (2006.01)
     G01J 3/453       (2006.01)
     G01N 21/3504     (2014.01)
     G02B 26/00       (2006.01)

(52) U.S. Cl.
     CPC .............. G01J 3/26 (2013.01); G01J 3/0256
     (2013.01); G01J 3/4535 (2013.01); G02B
     26/001 (2013.01); *G01N 21/3504* (2013.01)

(58) Field of Classification Search
     CPC ......... G01J 3/0256; G01J 3/26; G01J 3/4535;
               G02B 26/001; G02B 26/007; G01N
                                              21/3504
     See application file for complete search history.

(56) References Cited

U.S. PATENT DOCUMENTS

| | | | | |
|---|---|---|---|---|
| 5,550,373 | A | * | 8/1996 | Cole .................... G02B 26/001 |
| | | | | 356/519 |
| 5,589,689 | A | | 12/1996 | Koskinen |
| 5,646,729 | A | | 7/1997 | Koskinen et al. |
| 7,378,655 | B2 | | 5/2008 | Tai et al. |
| 2008/0035846 | A1 | | 2/2008 | Talghader et al. |
| 2009/0040616 | A1 | | 2/2009 | Lin et al. |
| 2015/0369663 | A1 | | 12/2015 | Margalit et al. |
| 2017/0309758 | A1 | | 10/2017 | Frey et al. |
| 2019/0265163 | A1 | * | 8/2019 | Johansen ............... G01N 21/45 |
| 2021/0262858 | A1 | * | 8/2021 | Noltemeyer .......... G01J 3/0291 |
| 2022/0357200 | A1 | | 11/2022 | D'Aleo et al. |
| 2023/0341743 | A1 | * | 10/2023 | Guo ........................ G02F 1/213 |

FOREIGN PATENT DOCUMENTS

| | | | |
|---|---|---|---|
| DE | 69511488 | T2 | 4/2000 |
| DE | 102020205599 | A1 | 11/2021 |
| EP | 1640694 | A2 | 3/2006 |
| EP | 1640694 | A3 | 7/2006 |
| JP | 2016007692 | A | 1/2016 |
| WO | WO-2021077396 | A1 * | 4/2021 ............. G02B 26/00 |

* cited by examiner

*Primary Examiner* — Michael A Lyons
(74) *Attorney, Agent, or Firm* — ArentFox Schiff LLP

(57) ABSTRACT

An interferometer is provided that includes a reflection region, a support region and two or more actuation regions. Each of the two or more actuation regions extend from the support region to the reflection region. A first reflector is fixed to the substrate at least in the reflection region. The interferometer includes a piezoelectric layer at least in the two or more actuation regions. Moreover, a second reflector is attached to the piezoelectric layer.

22 Claims, 12 Drawing Sheets

PIEZOELECTRIC INTERFEROMETER

CROSS REFERENCE TO RELATED APPLICATIONS

This application claims priority to European Application No. 22209598.6, filed Nov. 25, 2022, the entire contents of which are hereby incorporated by reference.

TECHNICAL FIELD

The present disclosure relates to interferometers, and, more particularly, to interferometers where the distance between two mirrors is altered with a force transducer. The present disclosure further concerns the interferometers where the force transducer is a piezoelectric force transducer.

BACKGROUND

Micromechanical Fabry-Perot interferometers typically comprise a top mirror that is suspended above a bottom mirror which lies on a substrate. The two mirrors are separated from each other by a tuning gap so that an optical tuning cavity is formed between the two mirrors. At least one of the two mirrors is at least partly transparent, so that electromagnetic radiation can enter the tuning cavity from one side. If the other mirror is also at least partly transparent, the radiation can exit it from the other side.

The light that enters the optical cavity can undergo multiple reflections between the bottom and top mirrors before it is transmitted out of the cavity. Constructive interference produces transmission peaks at wavelengths which correspond to the equation $2d=n\lambda$, where d is the height of the tuning gap and n is an integer. A wavelength at which constructive interference occurs may be called a transmission wavelength. A first-order transmission peak corresponding to n=1 will be accompanied by higher order transmission peaks from transmission wavelengths which meet the equation when n is greater than one. Order-sorting filters may be implemented adjacent to the Fabry-Perot interferometer to allow transmission only for wavelengths which correspond to one particular value of n.

Micromechanical interferometers can measure infrared light, visible light or ultraviolet light. The optimal tuning gap depends on the wavelength that should be measured. A common application is $CO_2$ detection based on measuring infrared absorption at different wavelengths. $CO_2$ has a strong absorption peak at a wavelength of 4.2-4.3 μm. By measuring the absorption, the gas concentration can be deduced. In practical applications, however, the measurement of light absorption at one wavelength alone is not sufficiently stable due to variations in the output of the IR light source and in detector sensitivity. To maintain accuracy, it is necessary to compare absorption at two or more different wavelengths. By comparing the absorption at different wavelengths, the sensor drift can be calibrated.

U.S. patent No. describes a Fabry Perot interferometer solution for selectively filtering IR light at desired wavelengths. The device is based on two Bragg mirrors separated by an air gap. By adjusting the gap, the interferometer IR passband wavelength can be adjusted. The gap adjustment is achieved by electrostatic actuation that pulls the mirrors closer together. In all interferometers which utilize electrostatic actuation, the tuning range is limited by the electrostatic pull in effect. If the top mirror is moved below a given minimum gap, it will suddenly be pulled all the way down and make physical contact with the bottom mirror.

U.S. Patent Publication No. 2009/0040616 describes a Fabry Perot interferometer which is actuated by piezoelectric actuators. The use of piezoelectric actuators allows a larger tuning range, thus extending the operational range of the interferometer. However, the construction of the interferometer is complex and expensive.

SUMMARY OF THE INVENTION

Accordingly, it is an object of the present disclosure to provide an interferometer that alleviates the above disadvantages. In particular, an interferometer is provided that includes a substrate having a planar surface that defines a horizontal plane with a vertical direction being perpendicular to the horizontal plane; a first reflector and a second reflector on the substrate, the second reflector configured to move in the vertical direction by one or more force actuators; a spacer that separates the first reflector from the second reflector by a tuning gap in the vertical direction; a reflection region; a support region; two or more actuation regions that include at least one piezoelectric layer and that extend from the support region to the reflection region; and at least one actuation electrode attached to the at least one piezoelectric layer in each of the two or more actuation regions. In this aspect, the first reflector is fixed to the substrate at least in the reflection region, and the second reflector is attached to the at least one piezoelectric layer.

In another exemplary aspect, an interferometer is provided that includes a substrate having a planar surface; a first reflector coupled to the planar surface of the substrate; a second reflector disposed above the first reflector and configured to move in a direction away from the substrate by one or more force actuators; a spacer that separates the first reflector from the second reflector by a tuning gap; and at least one piezoelectric layer disposed on the second reflector. In this aspect, the interferometer includes a reflection region, a support region, and two or more actuation regions. Moreover, an actuation electrode is attached to the at least one piezoelectric layer in each of the two or more actuation regions. Furthermore, the first reflector is attached to the substrate at least in the reflection region, and the second reflector is attached to the at least one piezoelectric layer.

In yet another exemplary aspect, a method is provided for manufacturing an interferometer that includes a reflection region and support region. In this aspect the method includes depositing a layer of first reflector material on a surface of a substrate; depositing a layer of spacer material on the layer of first reflector material; depositing a layer of second reflector material on the layer of spacer material; placing a layer of piezoelectric material on the layer of second reflector material and patterning the layer of piezoelectric material to form actuation parts in two or more actuation regions on the interferometer, such that each of the two or more actuation regions extend from a support region to a reflection region; depositing a layer of electrically conductive electrode material on the layer of piezoelectric material; patterning the layer of electrode material to be present at least in the two or more actuation regions; and removing the layer of spacer material from the reflection region and the two or more actuation regions.

The exemplary aspects of the present disclosure are based on the idea of using the same layer of piezoelectric material to provide structural support for one the mirrors and the force transduction needed for moving the mirror.

BRIEF DESCRIPTION OF THE DRAWINGS

In the following, the disclosure will be described in greater detail by means of exemplary embodiments with reference to the accompanying drawings, in which.

DETAILED DESCRIPTION

This disclosure presents an interferometer comprising a substrate having a planar surface that defines a horizontal plane and a vertical direction that is perpendicular to the horizontal plane. The interferometer also comprises a first reflector and a second reflector on the substrate. The second reflector is movable (e.g., configured to be moved) in the vertical direction by one or more force actuators. The interferometer also comprises a spacer that separates the first reflector from the second reflector in the vertical direction so that the first reflector is separated from the second reflector by a tuning gap.

The interferometer comprises a reflection region, a support region and two or more actuation regions. Each of the two or more actuation regions extend from the support region to the reflection region. The first reflector is fixed to the substrate at least in the reflection region. The interferometer comprises a piezoelectric layer at least in the two or more actuation regions. The second reflector is attached to the piezoelectric layer. The interferometer comprises at least one actuation electrode attached to the piezoelectric layer in each of the two or more actuation regions.

Figure 1A:
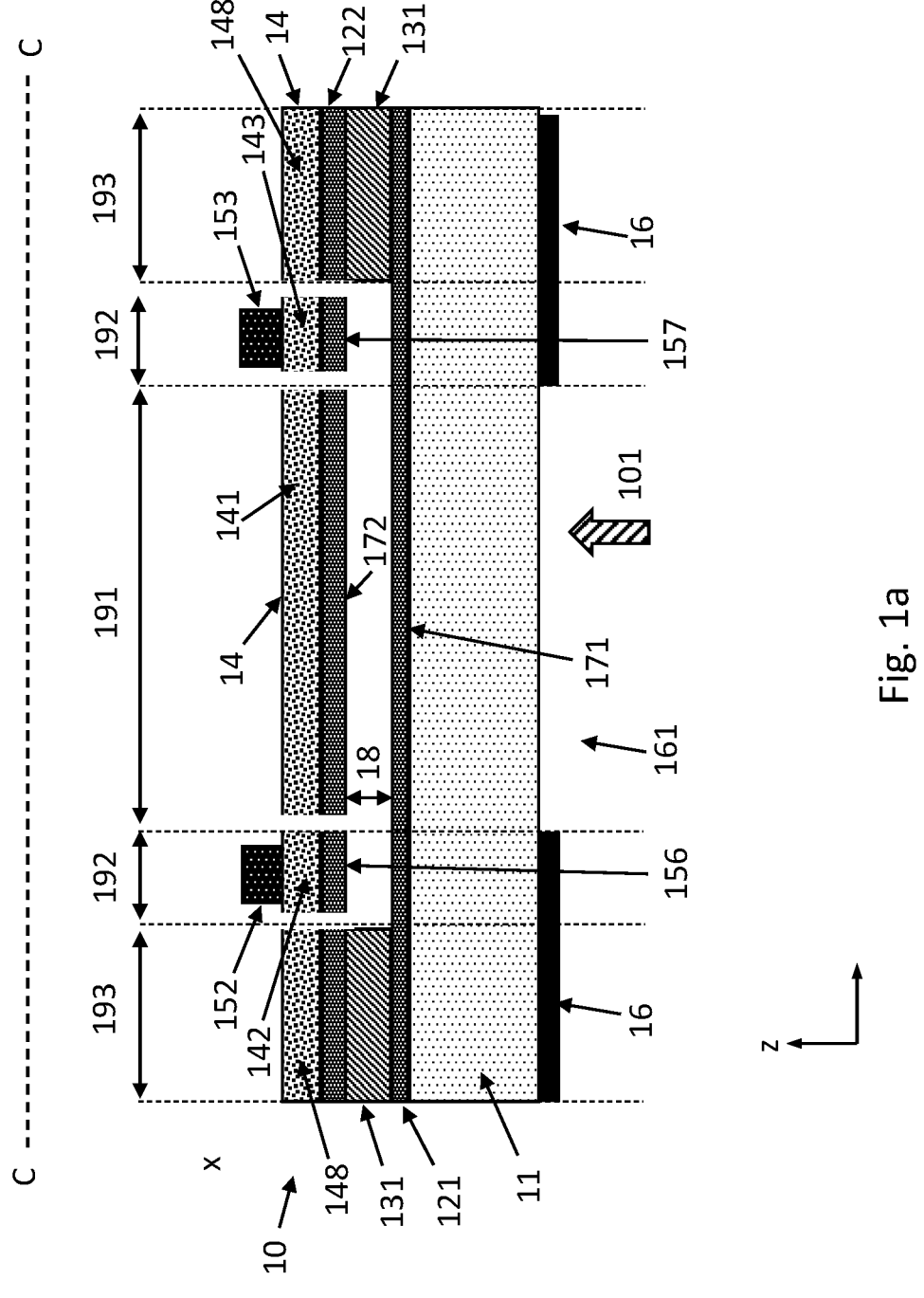
FIGS. 1a-1c illustrate an interferometer with a piezoelectric layer according to an exemplary aspect.

According to an exemplary aspect, FIG. 1a illustrates an interferometer 10 that includes a substrate 11. The substrate 11 has a planar surface that defines a horizontal plane that will be illustrated as the xy-plane in this disclosure. A vertical z-direction is perpendicular to this plane. For purposes of this disclosure, terms such as "horizontal", "vertical", "top", "bottom", "above" and "below" refer only to the substrate plane and to spatial relations with respect to that plane. They do not refer to orientations or spatial relations in relation to the Earth's gravitational field. In other words, the substrate may be tilted in any direction when the device is in use. The vertical direction could for example be perpendicular to the gravitational field when the device is being used, or the device could be oriented upside down with respect to the gravitational field (z-axis pointing toward the Earth) when it is used.

The interferometer 10 comprises a first reflector 171 and a second reflector 172. The first reflector 171 may be fixed to the substrate 11. It may, for example, be formed from a layer 121 of metal deposited on the substrate 11. In an exemplary aspect, the metal may be silver or aluminium. In all exemplary embodiments in this disclosure, the first reflector 171 may be so thin that it is partly transparent for electromagnetic radiation 101. The thickness required for partial transparency depends on the wavelength of the radiation 101. Infrared radiation can easily pass through a thin layer of metal. The substrate 11 may also be at least partly transparent to the electromagnetic radiation 101 which the interferometer 10 is intended to measure.

The bottom surface of the substrate 11 may comprise an optional anti-reflection layer (not illustrated) and an optional metallic layer 16 that delimits a region where incoming radiation 101 can enter the interferometer. This region may be called a bottom aperture 161. The bottom aperture 161 is an opening that is at least partly aligned with the reflection region 191. The reflection region 191 of the interferometer is the area where radiation can enter the interferometer and be reflected between the first and second reflectors 171 and 172. The layer which forms the first reflector 171 may be present only in the reflection region 191. Alternatively, as shown in FIG. 1a, the layer 121 which forms the first reflector 171 may extend beyond the reflection region and into the support region 193 and the actuation regions 192, as FIG. 1a illustrates.

The interferometer comprises a spacer 131 that may lie on the top surface of the substrate 11 or, as shown in FIG. 1a illustrates, on top of the layer 121 which forms the first reflector 171. The spacer 131 is present at least in some parts of the support region 193, and it may surround the tuning cavity. The vertical thickness of the spacer 131 determines the initial height (before either reflector is moved) of the tuning gap 18 between the first reflector 171 and the second reflector 172. The optimal thickness of the spacer 131 will depend on the wavelength of the electromagnetic radiation 101 which is to be detected.

As further shown, the second reflector 172 lies above the first reflector 171 in the reflector region 191. The second reflector 172 may, for example, be formed from a layer 122 which is deposited on the layer of spacer material. The layer 122 may for example be made of silver or aluminium in an exemplary aspect. A layer 14 of piezoelectric material, which may comprise regions 141-143 and 148 in FIG. 1a, may be disposed on the layer 122. If the layer 122 is limited only to the reflection region and the actuation region, the layer piezoelectric material may also be placed on the spacer 131.

In the exemplary embodiments in this disclosure, the thickness of the piezoelectric layer in the z-direction may for example be in the range 500 nm-5 µm, or in the range 500 nm-3 µm, or in the range 500 nm-2 µm, or in the range 1 µm-3 µm. The material of the piezoelectric layer may, for example, be lithium niobate, lithium tantalite, aluminium nitrate or lead zirconate titanate oxide (PZT). The use of crystalline materials such as lithium niobate and lithium tantalite are especially advantageous as they have predictable material characteristics and a large piezoelectric coefficient. The piezoelectric layer may be placed on the underlying layer by bonding it to that layer or by depositing it on the underlying layer. The piezoelectric layer may be a wafer or a deposited material layer.

The tuning cavity may be formed in an etching process where the layer of spacer material is removed from the reflection region and the actuation region. The layer 14 of piezoelectric material may be patterned in the same etching process. The layer 14 may then comprise at least a fixed part 148 in the support region 193 which forms a frame around the reflection region. They layer 14 may also comprise actuation parts 142-143 in the actuation regions 192. Optionally, the layer 14 may also comprise a central part 141 in the reflection region 191. Actuation electrodes 152-153 may be deposited on the actuation parts 142-143 in the actuation regions.

Figure 1B:
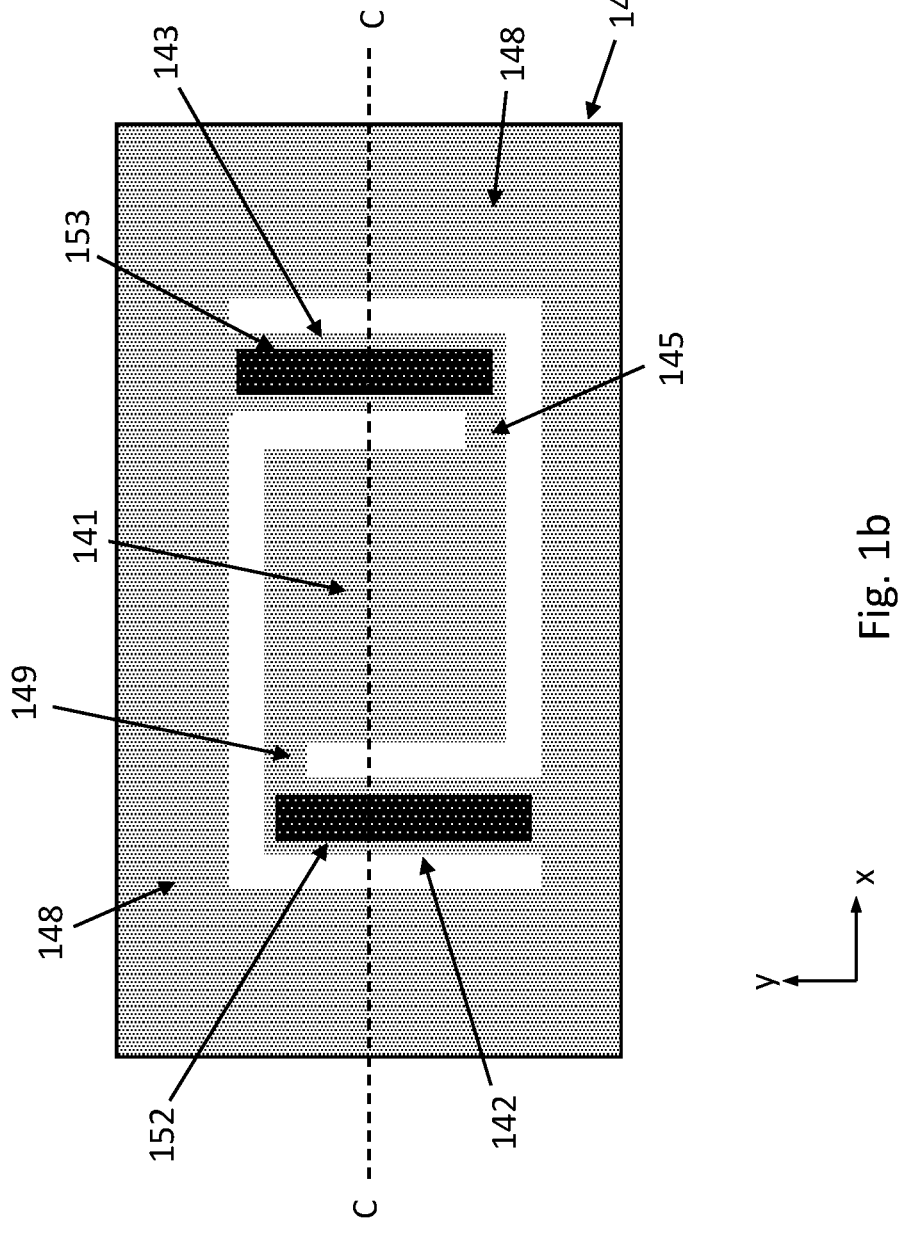

In an exemplary aspect, the piezoelectric layer can optionally be present also in the support region and may extend from the support region to the two or more actuation regions. FIG. 1b illustrates in the xy-plane one possible geometry for the piezoelectric interferometer where the piezoelectric layer 14 also extends from the actuation region to the reflection region. FIG. 1a is in this case a cross-section of the device in FIG. 1b along the line C-C. The actuation parts 142-143 have an elongated shape. One end of each actuation part 142/143 may be fixed to the fixed part 148 or to some other fixed structure. The actuation parts 142 and 143 can bend out of the xy-plane (in either z-direction) when an electric potential is applied to the actuation electrodes 152-153 and to the layer 122 that forms the second reflector. The actuation regions 142-143 of the piezoelectric layer 14, the actuation electrodes 152-153 and the parts of layer 122 that form counter-electrodes 156-157 on the opposite side of the piezoelectric layer 142-143 then together form a unimorph piezoelectric actuator in each actuation region. In other words, the actuation region of the piezoelectric layer 14 may be sandwiched between an actuation electrode 142-143 and a counter-electrode 156-157. If layer 122 is a metal layer, then the part of the metal layer which lies under the-actuation region of the piezoelectric layer 14 can be used as a counter-electrode. Counter-electrodes 156-157 could alternatively be made of a different, separately deposited material, instead of being made from the layer 122. The same actuation mechanism may be utilized in all embodiments presented in this disclosure.

The central part 141 of the piezoelectric layer 14 lies between the actuation parts 142-143. The actuation regions on piezoelectric layer 14 may, for example, comprise a narrow bridge 149 which extends from the free end of each actuation part to the central part 141. When the actuation parts 142-143 bend out of the xy-plane in the same z-direction, the central part 141 will also move out of the xy-plane in that z-direction. This mechanism allows the tuning gap to be changed by applying a voltage to the actuation electrodes 152-153.

The second reflector 172 is in FIG. 1a attached to the piezoelectric layer 14 in the reflection region 191. The second reflector may cover the entire area of the central part 141. The second reflector may have the shape of a rectangle, a polygon, or a circle. The side lengths of the rectangle or the diameter of the polygon or circle in the xy-plane may for example be in the range 100-500 μm. The width of the elongated actuation parts 142/143 along their narrow dimension in the xy-plane may be in the range 20-50 μm, for example. The length-to-width aspect ratio of the actuation parts may for example be in the range 5-100, or in the range 10-50, for example. It is noted that these dimension options can apply also to the embodiment illustrated in FIGS. 2a-2b.

Figure 1C:
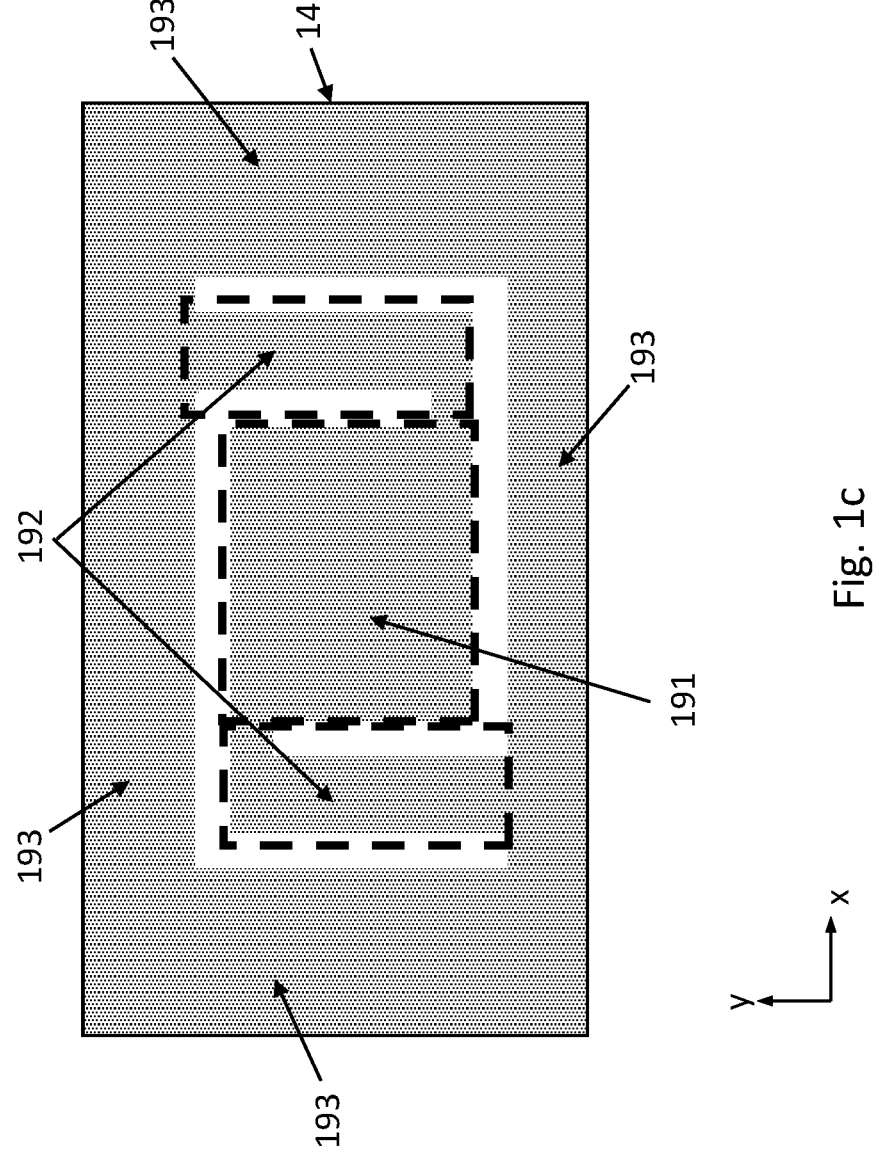

FIG. 1c illustrates the actuation regions 192, the reflection region 191 and the support region 193 on the piezoelectric layer 14. The support region 193 may comprise all parts of the piezoelectric region which lie outside of the reflection region and the actuation regions. The support region may surround both the reflection region and the two or more actuation regions, and the two or more actuation regions may be located substantially symmetrically with respect to the center of the reflection region, as FIG. 1c illustrates. The symmetry may be point symmetry. In FIG. 1c, the two or more actuation regions comprise two actuation regions 192 on opposite sides of the reflection region 191.

Figure 2A:
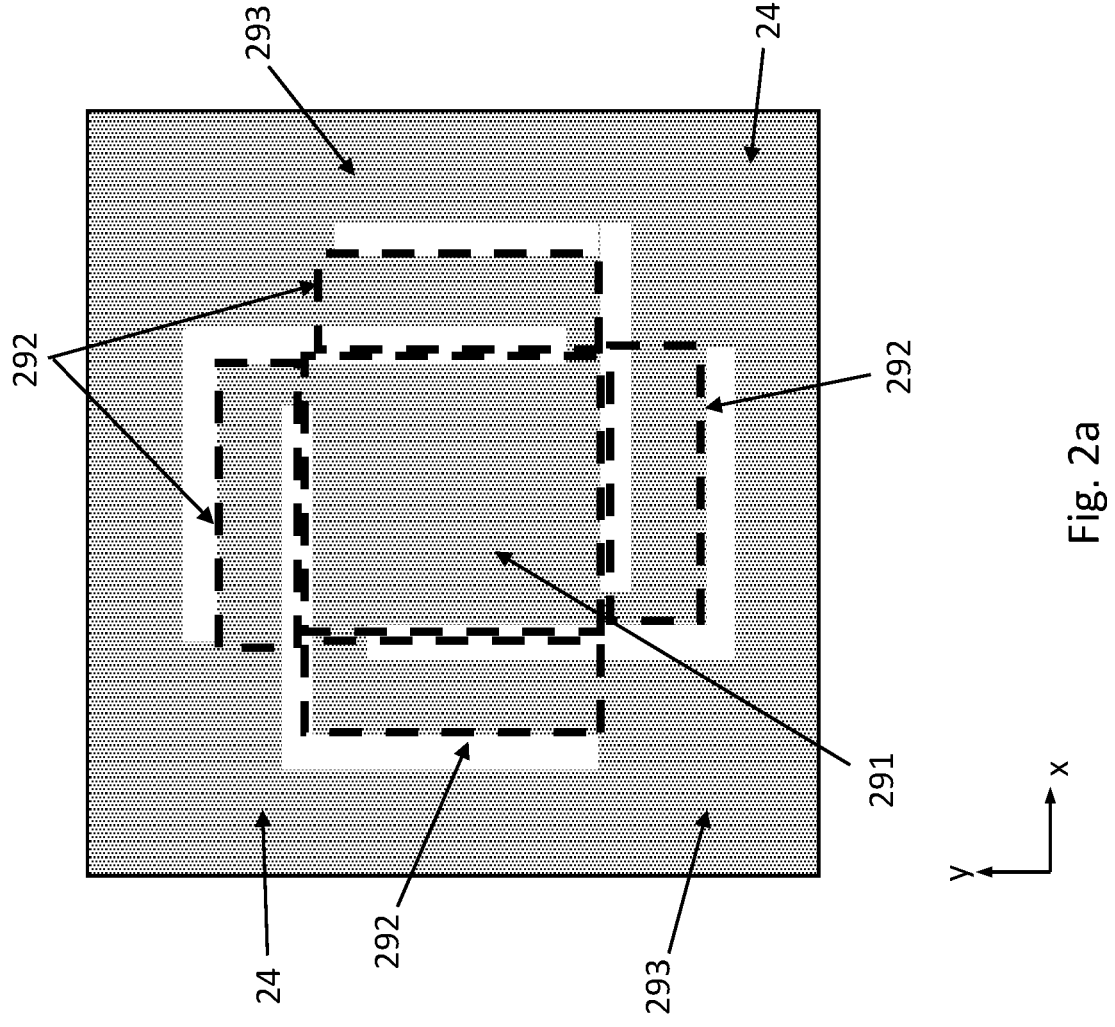
FIGS. 2a-2c illustrate an alternative geometry according to an exemplary aspect.
Figure 2B:
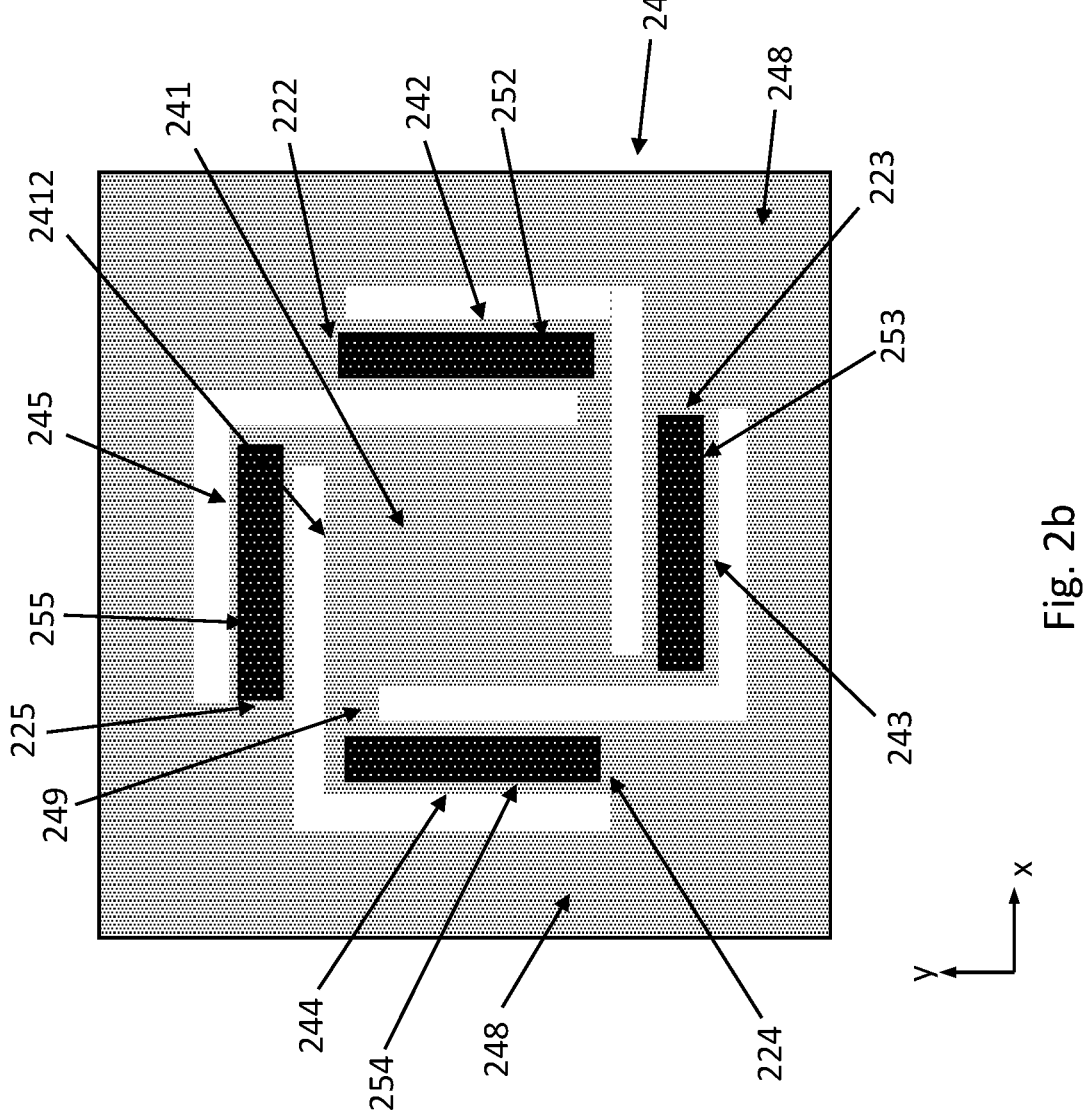

FIG. 2a illustrates an alternative geometry according to an exemplary aspect. Reference numbers 24 and 291-293 correspond to reference numbers 14 and 191-193, respectively, in FIG. 1c, but the geometry differs from FIG. 1c in that the two or more actuation regions here comprise four actuation regions 292 placed around the edges of the reflection region 291. The symmetry may be point symmetry. FIG. 2b illustrates the same piezoelectric layer 24 which has a central part 241, actuation parts 242-245 and fixed part 248. Actuation electrodes 252-255 lie on top of the actuation parts 242-245. One end of each actuation part 242-245 is fixed to the fixed part 248 of the piezoelectric layer 24, while the other end (e.g., the free end) can move out of the xy-plane when a voltage is applied to the corresponding actuation electrode. A narrow bridge extends from the free end of each actuation part to the central part 241. When all actuation parts bend in the same z-direction, the central part 241, and the second reflector which is attached to the central part, will move in that direction.

Therefore, the piezoelectric layer 14/24 can comprise in each of the two or more actuation regions an actuation part which has a fixed end which is attached to a fixed structure (for example the fixed part 148/248 of the piezoelectric layer) and a free end which can move in the z-direction when the actuation part bends. The free end of each actuation part may comprise a bridge 149/249 that attaches the actuation part to the central part 141/241 of the piezoelectric layer. Alternatively, if the piezoelectric layer does not have a central part (as in FIG. 3a), the second reflector may be attached to these bridges 149/249.

The width of the bridge (for example 249) along the direction which corresponds to the length-dimension of the actuation part (the y-direction for actuation part 244 in FIG. 2b) may for example be less than a third, less than a fifth or less than a tenth of the length of the actuation part in that direction. The bridge may be narrow enough to undergo some torsional twisting when the free end of the actuation part moves in the z-direction.

Figure 2C:
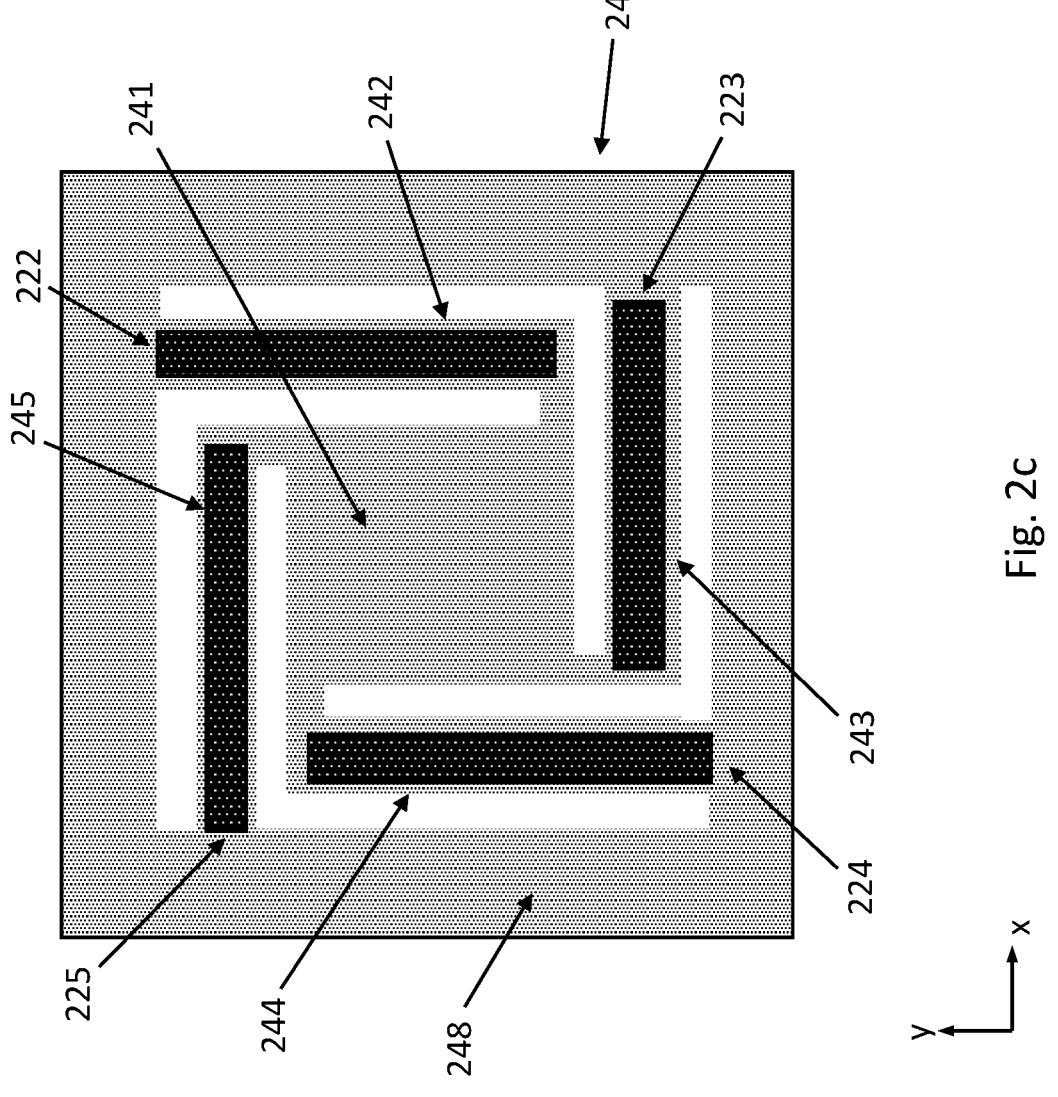

Each fixed end 222-225 of an actuation part 242-245 may be aligned or approximately aligned with one edge of the reflection region, like fixed end 222 is aligned in the x-direction with the side 2412 of the central part 241 of the piezoelectric layer, as FIG. 2c illustrates, the fixed ends 222-225 may alternatively be located beyond the edges of the reflection region if it is preferable to utilize a longer actuation part which achieves a greater displacement in the z-direction. To maximize the length of the actuation parts further, each free end of an actuation parts 242-245 may be attached to the central part 241 and/or to the second reflector at a corner of the reflection region 291, as FIGS. 2a and 1c illustrate. It is noted that these optional features can apply to all exemplary embodiments in this disclosure.

In all exemplary embodiments in this disclosure, the radiation that undergoes constructive interference in the interferometer can either pass through the second reflector or be absorbed in the second reflector. The wavelength of the incoming radiation may be in the infrared, visible or ultraviolet parts of the electromagnetic spectrum in any embodiment presented in this disclosure.

If the incoming radiation 101 is infrared radiation in FIG. 1a, then the radiation that undergoes constructive interference in the interferometer can be absorbed in the second reflector 172 so that it is heated. The heating of the second reflector 172 may polarize the central part 141 of the piezoelectric layer, and the surface potential of the central part 141 may then be measured as an indicator of the intensity of the incoming radiation 101 at the selected transmission wavelength (which is determined by the height of the tuning gap). Alternatively, a temperature measurement may be performed on the top surface of the central part 141, and the measurement result can be interpreted as an indicator of radiation intensity at the selected transmission wavelength.

Figure 3A:
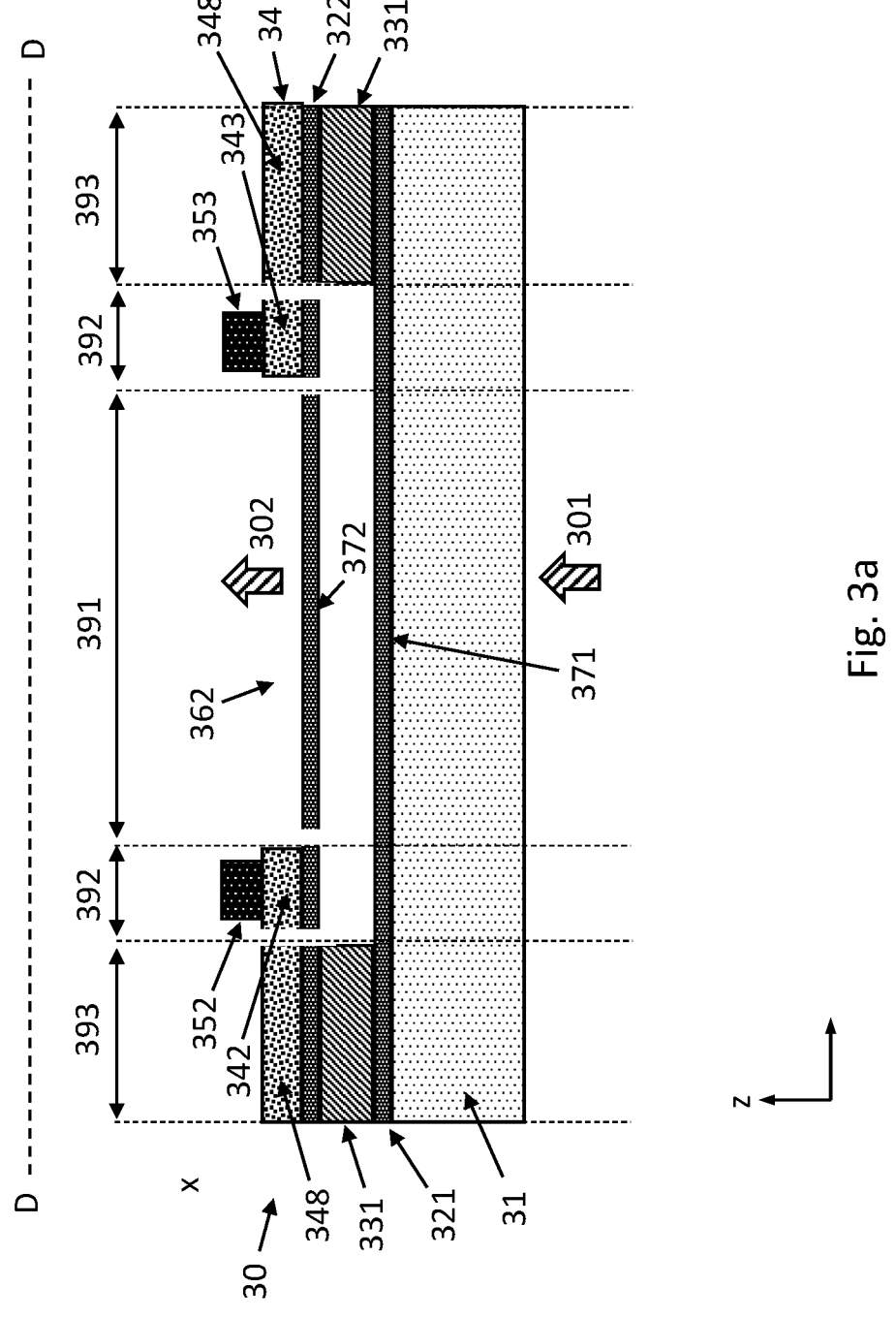
FIGS. 3a-3b illustrate an interferometer where the piezoelectric layer is not present in the reflection region according to an exemplary aspect.

FIG. 3a illustrates an interferometer where reference numbers 30, 301, 31, 321, 322, 331, 34, 342-343, 348, 352-353, 371-372 and 391-393 correspond to reference numbers 10, 101, 11, 121, 122, 131, 14, 142-143, 148, 152-153, 171-172 and 191-193, respectively, in FIGS. 1a and 1b. In this interferometer the layer 322 which forms the second reflector 372 in the reflection region 391 is suspended between the actuation parts 342-343 of the piezoelectric layer 34. The piezoelectric layer 34 is not present in the reflection region 391. The opening above the second reflector 372 may be called a top aperture 362.

If the radiation that undergoes constructive interference passes through the second reflector 372, then it can be measured with a radiation detector to determine radiation intensity at the selected transmission wavelengths. Alternatively or complementarily, if the second reflector 372 absorbs at least a part of the radiation which undergoes constructive interference, then the temperature of the second reflector 372 may be measured as an indicator of radiation intensity at the selected transmission wavelength. This applies also to the devices shown in FIGS. 4 and 5a below. In any of these devices, the directions 301 and 302 could be reversed, so that the incoming radiation 301 would enter the interferometer through the top aperture 362 from the top side, and outgoing radiation 302 would exit from the bottom side.

Figure 3B:
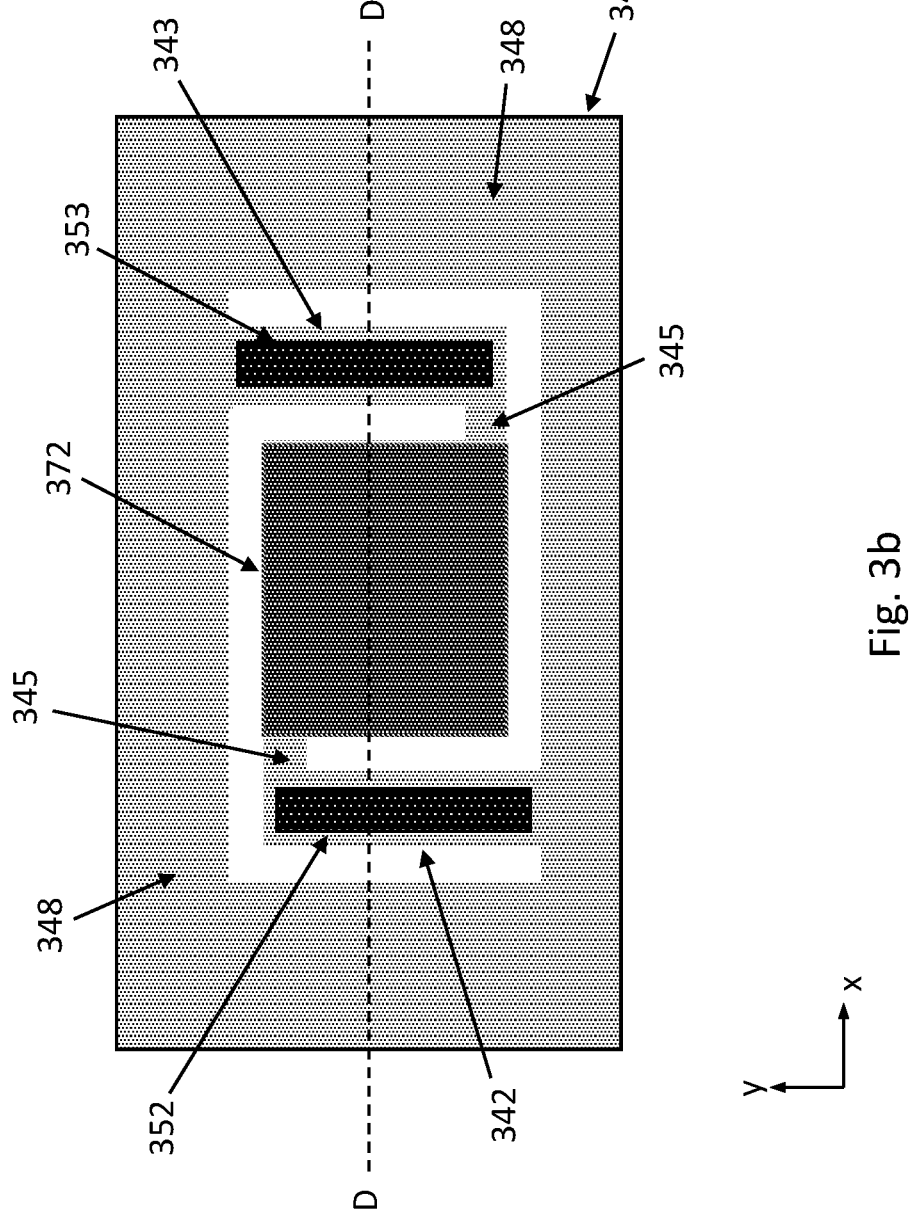

FIG. 3b illustrates the same interferometer in the xy-plane. FIG. 3a is a cross-section of the device shown in FIG. 3a along the line D-D. The piezoelectric material 34 has in this case been removed from the reflection region 391, but the layer 322 remains attached to the piezoelectric layer in the actuation regions 392. The second reflector 372 is in this case attached to the piezoelectric layer 34 in the actuation region. The out-of-plane bending of the piezoelectric actuators in regions 392 can therefore move the second reflector 372 in the positive or negative z-direction.

Figure 4:
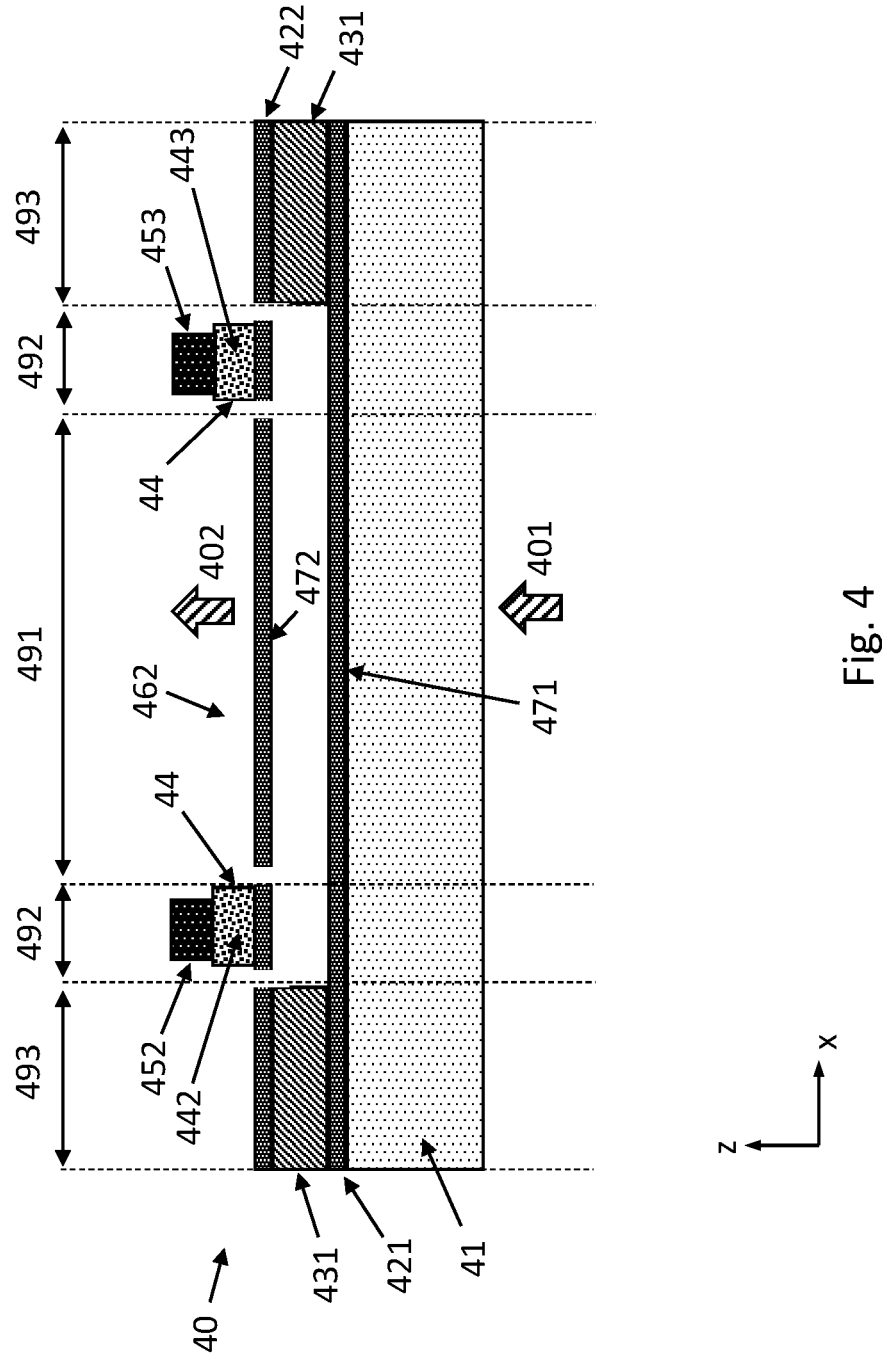
FIG. 4 illustrates an interferometer where the piezoelectric layer is not present in the reflection region or in the support region according to an exemplary aspect.

FIG. 4 illustrates an interferometer where reference numbers 40, 401-402, 41, 421-422, 431, 44, 442-443, 452-453, 462, 471-472 and 491-493 correspond to reference numbers 30, 301-302, 31, 321-322, 331, 34, 342-343, 352-353, 362, 371-372 and 391-393, respectively, in FIG. 3a. In FIG. 4 the piezoelectric layer 44 is not present in the support region 493 or in the reflection region 491. It is only present in the actuation regions 492 where it is needed to generate the actuating force which moves the second reflector 472. Another alternative, which has not been separately illustrated, is that the piezoelectric layer could be present in the two or more actuation regions and in the reflection region, but not in the support region.

Figure 5A:
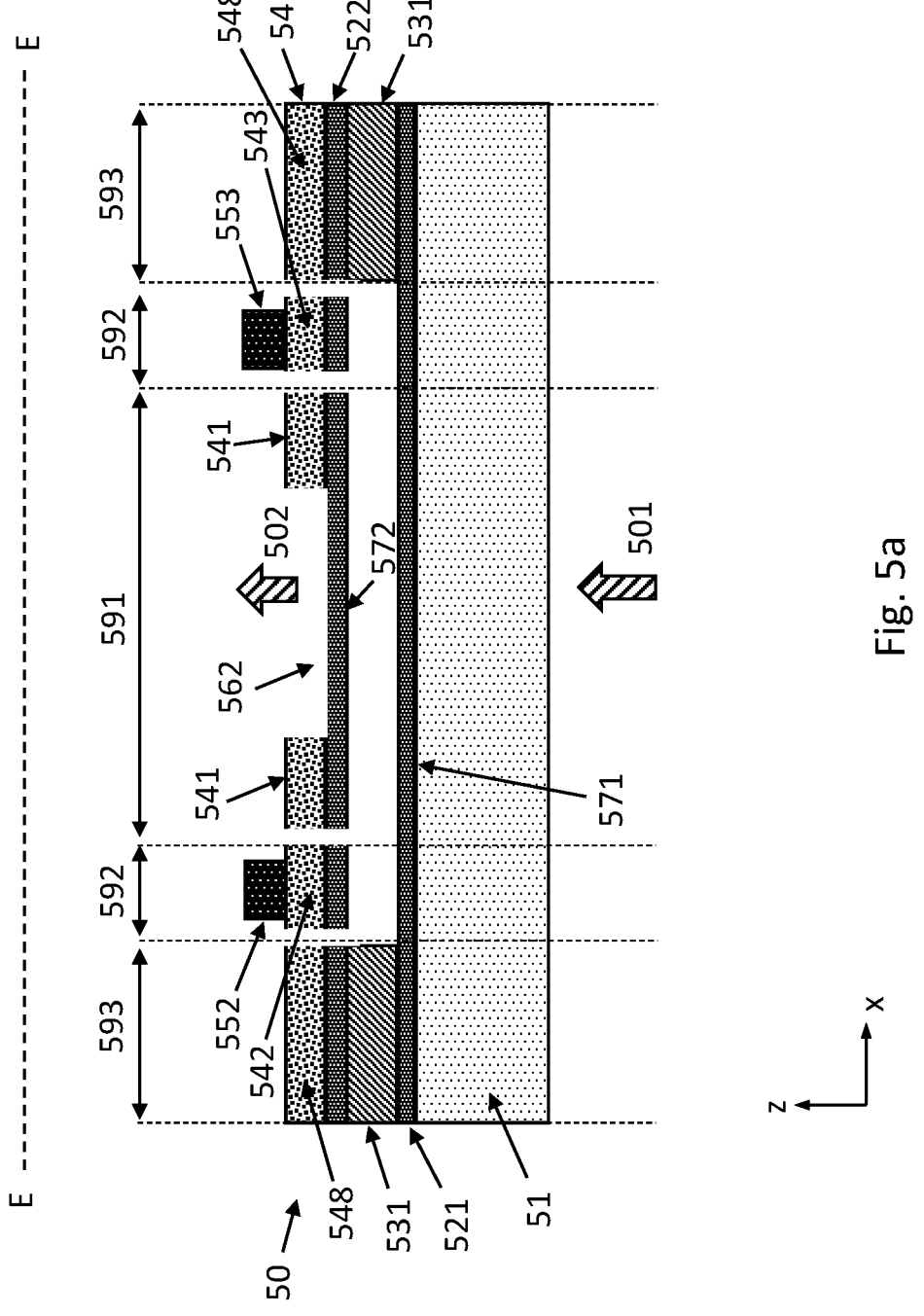
FIGS. 5a-5b illustrate an interferometer where the piezoelectric layer comprises a top aperture in the piezoelectric layer in the reflection region according to an exemplary aspect.

FIG. 5a illustrates an interferometer where the piezoelectric layer comprises a top aperture in the reflection region. Reference numbers 50, 501-502, 51, 521-522, 531, 54, 541-543, 548, 552-553, 571-572 and 591-593 correspond to reference numbers 10, 101-102, 11, 121-122, 131, 14, 141-143, 148, 152-153, 171-172 and 191-193, respectively, in FIG. 1a. In this aspect, the piezoelectric layer 54 comprises the fixed part 548, actuation parts 542-543 and a central part

548 as described earlier, but the central part 548 does not cover the entire reflector region 591. Instead, the central part 548 of the piezoelectric layer 54 comprises an opening, which may be called the top aperture 562. Outgoing radiation 502 can easily pass through this aperture and be measured with a radiation detector. As in the previous embodiments, the directions of outgoing and incoming radiation may be reversed, so that the interferometer is illuminated from the top instead of from the bottom.

Figure 5B:
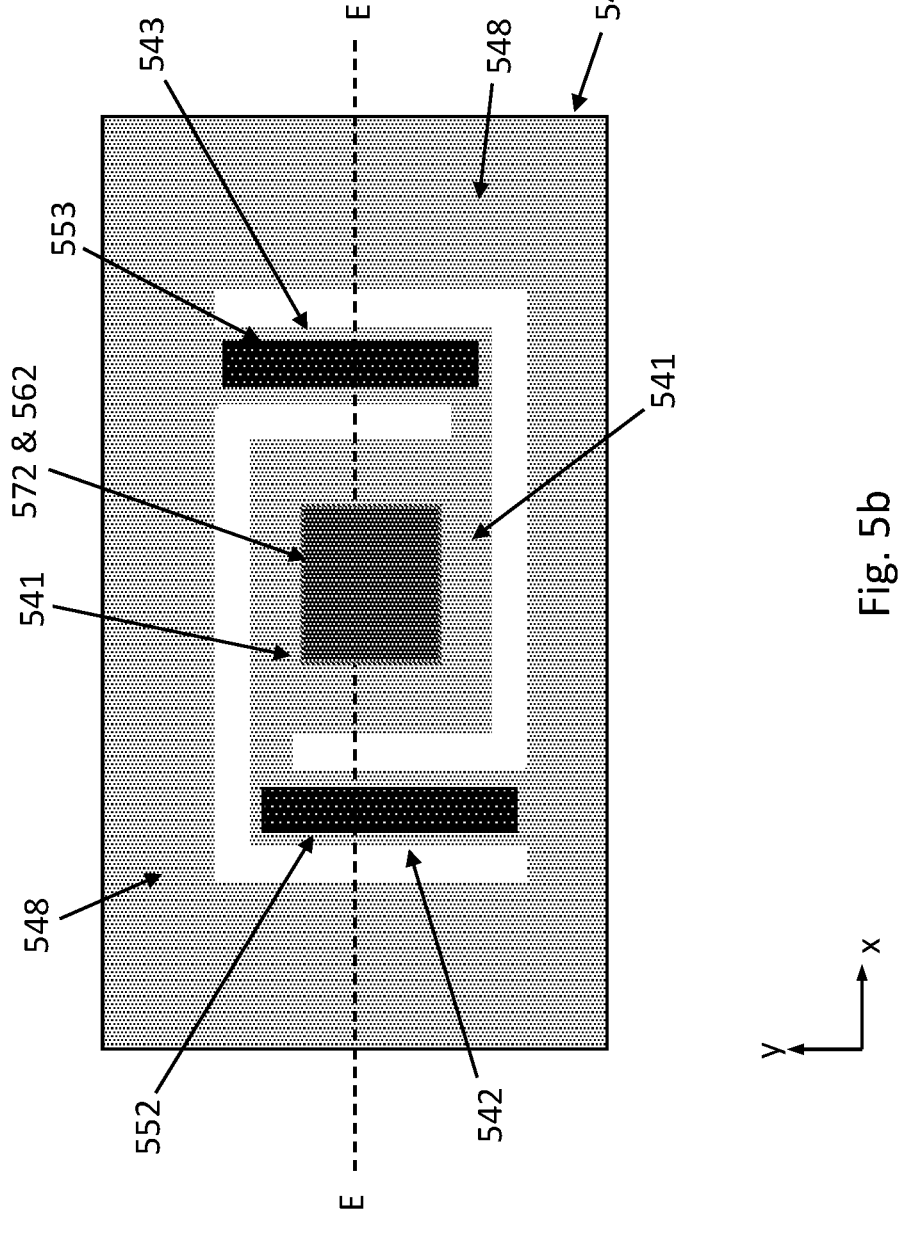

It is noted that the optional features illustrate in FIG. 5a may be preferable to the one shown in FIGS. 3a and 4 if the second reflector does not obtain sufficient structural support from being attached to the piezoelectric layer only in the actuation region. The arrangement in FIG. 5a allows the second reflector 572 to be strongly attached to the central part 541 of the piezoelectric layer 54 while also allowing radiation to pass easily through the interferometer. FIG. 5b illustrates one possible configuration for the same interferometer in the xy-plane. FIG. 5a is a cross-section along the line E-E in FIG. 5b. The central part 541 of the piezoelectric layer 54 here forms a frame around the reflector aperture 562, and the second reflector 572 is visible through the reflector aperture. Many other geometries are also possible. The reflector aperture 562 does not necessarily have to be surrounded by the central part 541.

As mentioned above, the first and second reflectors may be metal layers in all exemplary embodiments in this disclosure. Alternatively, the first or the second reflector may be a metal layer, and the other may be a Bragg mirror. Alternatively, in any embodiment presented in this disclosure, the first and second reflectors may be Bragg mirrors comprising multiple layers of dielectric materials. Alternatively, the first or the second reflector may be a Bragg mirror, and the other may be a metal layer.

An asymmetrical structure where one reflector is a Bragg mirror and the other a metal layer has good wavelength selectivity compared to symmetrical structures where both mirrors are metallic. Although either reflector could be metallic in the asymmetrical structure, there is an additional benefit in forming the second reflector with a metal layer and the first with the Bragg mirror, since the same metal layer may then act both as an electrode for the piezoelectric actuators and as the second reflector.

A method for manufacturing the interferometer illustrated in the figures can includes depositing a layer of first reflector material on the surface of a substrate, depositing a layer of spacer material on the layer of first reflector material, and depositing a layer of second reflector material on the layer of spacer material. The method includes placing a layer of piezoelectric material on the layer of second reflector material and patterning the layer of piezoelectric material so that it forms actuation parts in two or more actuation regions on the interferometer, wherein each of the two or more actuation regions extend from the support region to the reflection region. The method further includes depositing a layer of electrically conductive electrode material on the layer of piezoelectric material, patterning the layer of electrode material so that it is present at least in the two or more actuation regions, and removing the layer of spacer material from the reflection region and the two or more actuation regions.

Figure 6:
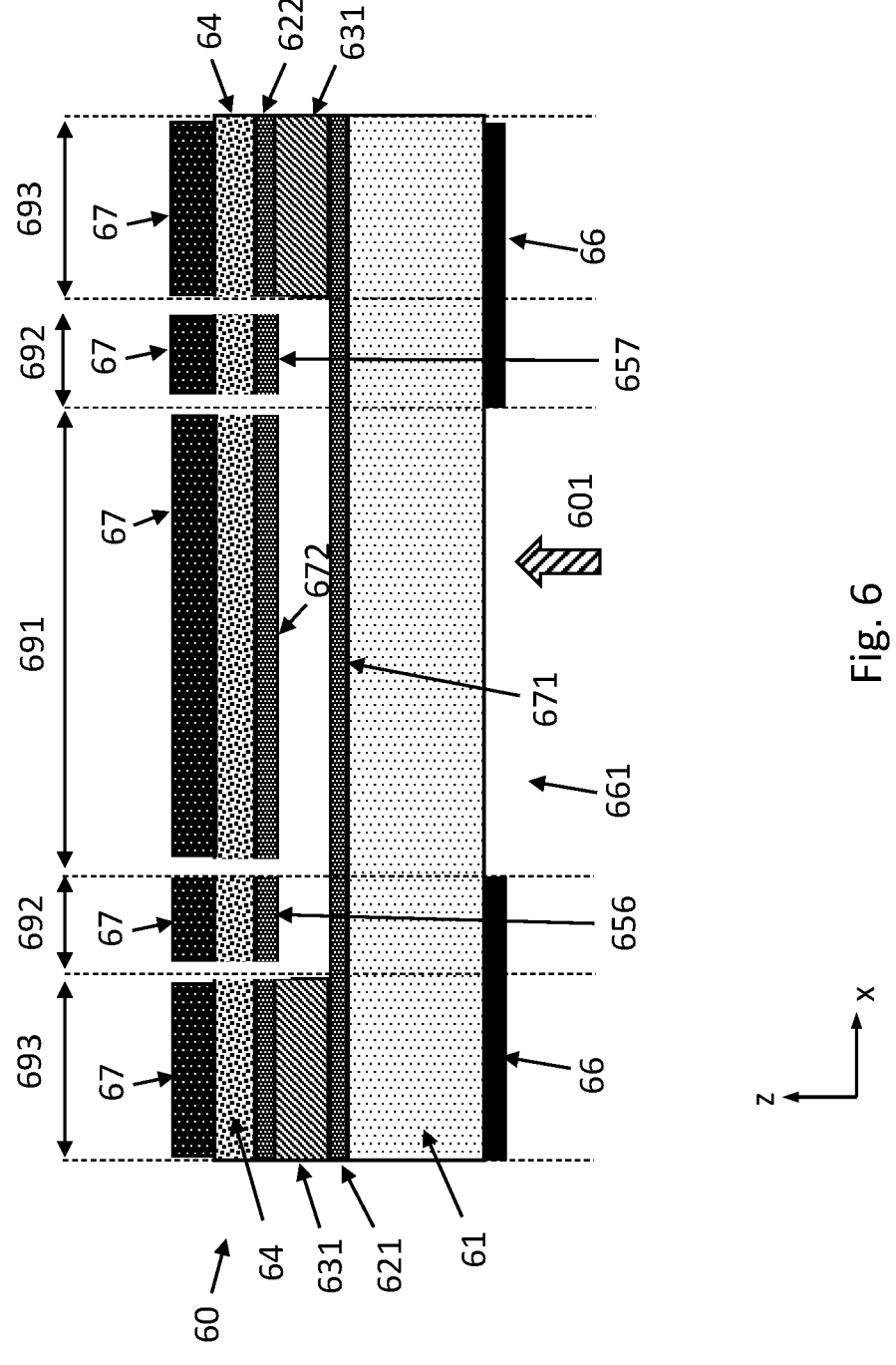
FIG. 6 illustrates an interferometer which comprises a silicon wafer on top of the piezoelectric layer according to an exemplary aspect.

FIG. 6 illustrates an alternative interferometer 60 where reference numbers 61, 621, 622, 631, 656-657, 66, 671-672 and 691-693 correspond to reference numbers 11, 121, 122, 131, 156-157, 16, 171-172 and 191-193, respectively. The interferometer in FIG. 6 also comprises a silicon wafer 67 on top of the layer of piezoelectric material 64. The layer of piezoelectric material 64 may first be deposited on the silicon wafer 67 and the wafer may then be bonded to the substrate 61 and to the layers on top of the substrate. The thickness of the piezoelectric layer 64 in the z-direction may be less than the thickness of the silicon wafer 67 in the z-direction, even though they are for illustrative purposes shown with approximately the same thickness in FIG. 6. As illustrated in FIG. 6, both the silicon wafer 67 and the piezoelectric layer 64 may be patterned in the reflection region 691 and the actuation regions 692 so that elongated piezoelectric actuators are formed in each actuation region. The part of the silicon wafer 67 that lies in the actuation regions 692 may be used as the actuation electrode in the piezoelectric actuator. The layer 64 of piezoelectric material extends in FIG. 6 to the support region 693, but it may alternatively be omitted from this region. Furthermore, an opening such as the top aperture 362 in FIG. 3a may be prepared in the silicon wafer 67 (and the piezoelectric layer 64) before the wafer is bonded to the substrate. It is noted that this option has not been separately illustrated in FIG. 6.

In practice, the layers illustrated in FIGS. 1a, 3a, 4, 5a and 6 can be deposited or placed one after the other on top of the substrate. The patterning of the piezoelectric material then determines where the actuation region is located. An elongated actuation part may be formed from the piezoelectric material in each actuation region, so that it has a fixed end which is attached to the support region. As described above with reference to FIGS. 1a, 3a, 4, 5a and 6, the piezoelectric material may optionally be fully or partly removed from the reflection region and/or from the support region. Each actuation part, which is formed from the layer of piezoelectric material when the layer is patterned, extends from the support region to the reflection region. When the layer of spacer material is removed from the reflection region and actuation region, the piezoelectric actuators and the second reflector are released from surrounding fixed structures. The actuators thereby become flexible suspenders which support the weight of the second reflector and enable the second reflector to be moved in the z-direction, as described above.

In general, it is noted that the exemplary embodiments described above are intended to facilitate the understanding of the present invention and are not intended to limit the interpretation of the present invention. The present invention may be modified and/or improved without departing from the spirit and scope thereof, and equivalents thereof are also included in the present invention. That is, exemplary embodiments obtained by those skilled in the art applying design change as appropriate on the embodiments are also included in the scope of the present invention as long as the obtained embodiments have the features of the present invention. For example, each of the elements included in each of the embodiments, and arrangement, materials, conditions, shapes, sizes, and the like thereof are not limited to those exemplified above and may be modified as appropriate. It is to be understood that the exemplary embodiments are merely illustrative, partial substitutions or combinations of the configurations described in the different embodiments are possible to be made, and configurations obtained by such substitutions or combinations are also included in the scope of the present invention as long as they have the features of the present invention.

What is claimed:

1. An interferometer comprising:
a substrate having a planar surface that defines a horizontal plane with a vertical direction being perpendicular to the horizontal plane;
a first reflector on the substrate;

a second reflector above the first reflector, the second reflector configured to move in the vertical direction by one or more force actuators;
a spacer that separates the first reflector from the second reflector by a tuning gap in the vertical direction;
a reflection region;
a support region;
two or more actuation regions that include at least one piezoelectric layer and that extend from the support region to the reflection region; and
at least one actuation electrode attached to the at least one piezoelectric layer in at least one actuation region of the two or more actuation regions,
wherein the first reflector is fixed to the substrate at least in the reflection region, and the second reflector is attached to the at least one piezoelectric layer,
wherein the second reflector and the at least one actuation electrode in the at least one actuation region are made of a same metal layer, and
wherein the at least one piezoelectric layer comprises a top aperture in the reflection region, the top aperture in the reflection region causing radiation that undergoes constructive interference in the interferometer to pass through the second reflector and through the interferometer.

2. The interferometer according to claim 1, wherein the at least one piezoelectric layer extends from the at least one actuation region to the reflection region.

3. The interferometer according to claim 2, wherein the second reflector is attached to the at least one piezoelectric layer in the reflection region.

4. The interferometer according to claim 3, wherein the at least one piezoelectric layer comprises an aperture in the reflection region.

5. The interferometer according to claim 1, wherein the second reflector is attached to the at least one piezoelectric layer in the at least one actuation region.

6. The interferometer according to claim 5, further comprising:
a portion of a silicon wafer,
wherein:
the at least one piezoelectric layer is deposited on the portion of the silicon wafer; and
the portion of the silicon wafer with the at least one piezoelectric layer is bonded to the substrate with the at least one piezoelectric layer on the second reflector.

7. The interferometer according to claim 5, wherein:
the at least one piezoelectric layer is elongated from the reflection region to at least two actuation areas on opposite sides of the reflection region; and
parts of a layer that forms the second reflector are configured to be electrodes for actuators in the at least two actuation areas.

8. The interferometer according to claim 1, wherein the support region surrounds both the reflection region and the two or more actuation regions.

9. The interferometer according to claim 8, wherein the two or more actuation regions are located substantially symmetrically in relation to a center of the reflection region.

10. The interferometer according to claim 9, wherein the two or more actuation regions comprise two actuation regions on opposite sides of the reflection region.

11. The interferometer according to claim 9, wherein the two or more actuation regions comprise four actuation regions disposed around edges of the reflection region.

12. The interferometer according to claim 1, wherein at least one of the first reflector and the second reflector is a metal layer.

13. The interferometer according to claim 1, wherein at least one of the first reflector and the second reflector is a Bragg mirror comprising multiple layers of dielectric materials.

14. An interferometer comprising:

a substrate having a planar surface;

a first reflector coupled to the planar surface of the substrate;

a second reflector disposed above the first reflector and configured to move in a direction away from the substrate by one or more force actuators;

a spacer that separates the first reflector from the second reflector by a tuning gap; and at least one piezoelectric layer disposed on the second reflector, wherein the interferometer includes a reflection region, a support region, and two or more actuation regions, wherein an actuation electrode is attached to the at least one piezoelectric layer in at least one actuation region of the two or more actuation regions, wherein the first reflector is attached to the substrate at least in the reflection region, and the second reflector is attached to the at least one piezoelectric layer, wherein the second reflector and the actuation electrode in the at least one actuation region are made of a same metal layer, and wherein the at least one piezoelectric layer comprises a top aperture in the reflection region, the top aperture in the reflection region causing radiation that undergoes constructive interference in the interferometer to pass through the second reflector and through the interferometer.

15. The interferometer according to claim 14, wherein the at least one piezoelectric layer extends from the at least one actuation region to the reflection region, and the second reflector is attached to the at least one piezoelectric layer in the reflection region.

16. The interferometer according to claim 15, wherein the at least one piezoelectric layer comprises an aperture in the reflection region.

17. The interferometer according to claim 14, wherein the second reflector is attached to the at least one piezoelectric layer in the at least one actuation region.

18. The interferometer according to claim 14, wherein:

the support region surrounds both the reflection region and the two or more actuation regions, and the two or more actuation regions are located substantially symmetrically in relation to a center of the reflection region.

19. The interferometer according to claim 18, wherein the two or more actuation regions comprise two actuation regions on opposite sides of the reflection region.

20. The interferometer according to claim 18, wherein the two or more actuation regions comprise four actuation regions disposed around edges of the reflection region.

21. The interferometer according to claim 14, wherein at least one of the first reflector and the second reflector is a metal layer.

22. A method for manufacturing an interferometer that includes a reflection region and support region, the method comprising:

depositing a layer of first reflector material on a surface of a substrate;

depositing a layer of spacer material on the layer of first reflector material;

depositing a layer of second reflector material on the layer of spacer material;

placing a layer of piezoelectric material on the layer of second reflector material and patterning the layer of piezoelectric material to form actuation parts in two or more actuation regions on the interferometer, such that each of the two or more actuation regions extend from a support region to a reflection region;

depositing a layer of electrically conductive electrode material on the layer of piezoelectric material;

patterning the layer of electrode material to be present at least in the two or more actuation regions; and removing the layer of spacer material from the reflection region and the two or more actuation regions, wherein the layer of second reflector material and the layer of electrode material in the two or more actuation regions are made of a same metal layer, and wherein the layer of piezoelectric material is patterned to comprise a top aperture in the reflection region, the top aperture in the reflection region causing radiation that undergoes constructive interference in the interferometer to pass through the interferometer.

* * * * *